(12) United States Patent
Zhou (10) Patent No.: US 11,393,205 B2
(45) Date of Patent: Jul. 19, 2022

(54) METHOD OF PUSHING VIDEO EDITING MATERIALS AND INTELLIGENT MOBILE TERMINAL

(71) Applicant: GUANGZHOU BAIGUOYUAN INFORMATION TECHNOLOGY CO., LTD., Guangzhou (CN)

(72) Inventor: Yutao Zhou, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 16/767,677

(22) PCT Filed: Nov. 30, 2018

(86) PCT No.: PCT/CN2018/118373
§ 371 (c)(1),
(2) Date: May 28, 2020

(87) PCT Pub. No.: WO2019/105440
PCT Pub. Date: Jun. 6, 2019

(65) Prior Publication Data
US 2020/0293784 A1    Sep. 17, 2020

(30) Foreign Application Priority Data
Nov. 30, 2017 (CN) .......................... 201711239996.1

(51) Int. Cl.
*G06V 20/40*    (2022.01)
*G06K 9/62*    (2022.01)
*G11B 27/031*    (2006.01)

(52) U.S. Cl.
CPC ........... *G06V 20/41* (2022.01); *G06K 9/6215* (2013.01); *G11B 27/031* (2013.01)

(58) Field of Classification Search
CPC ............. G06K 9/00718; G06K 9/6215; G11B 27/031; G06V 20/41
See application file for complete search history.

(56) References Cited

U.S. PATENT DOCUMENTS

2012/0084404 A1* 4/2012 Haot ................. G11B 27/11
                                                                  709/219
2014/0101138 A1  4/2014 Sugita

FOREIGN PATENT DOCUMENTS

| CN | 102663794 A | 9/2012 |
|----|-------------|--------|
| CN | 104703043 A | 6/2015 |
| CN | 105072337 A | 11/2015 |
| CN | 106779073 A | 5/2017 |
| CN | 107040795 A | 8/2017 |

(Continued)

*Primary Examiner* — Mishawn N. Hunter
(74) *Attorney, Agent, or Firm* — Dilworth & Barrese, LLP.; Michael J. Musella, Esq.

(57) ABSTRACT

Disclosed is a method of pushing video editing materials including: acquiring an editing instruction; acquiring at least one frame image of an editing video according to the editing instruction, inputting the frame image into an environment classification model, and acquiring classification information which is output by the environment classification model and represents an environment in the frame image; and acquiring video editing materials according to the classification information, so that the video editing materials match an image environment of the frame image. An intelligent mobile terminal is also disclosed.

17 Claims, 4 Drawing Sheets

(56) References Cited

FOREIGN PATENT DOCUMENTS

| CN | 107295362 A | 10/2017 |
|---|---|---|
| CN | 107959883 A | 4/2018 |

\* cited by examiner

METHOD OF PUSHING VIDEO EDITING MATERIALS AND INTELLIGENT MOBILE TERMINAL

CROSS-REFERENCE TO RELATED APPLICATION

The present application is a National Stage of International Application No. PCT/CN2018/118373, filed on Nov. 30, 2018, which claims priority to Chinese Patent Applications No. 201711239996.1 filed with the China National Intellectual Property Administration on Nov. 30, 2017 and entitled "VIDEO EDITING PUSH METHOD AND SYSTEM, AND INTELLIGENT MOBILE TERMINAL", the entire contents of which are incorporated herein by reference.

TECHNICAL FIELD

The embodiments of the present disclosure relate to the field of live broadcasting, and more particularly to a method of pushing video editing materials, and an intelligent mobile terminal.

BACKGROUND

Video editing refers to an editing process in which expected images that are captured firstly with a video camera are made into a disc by a video editing software on a computer. However, as the processing capability of the intelligent mobile terminal is getting better and better, instant editing of video has become a demand during the development, and it is a new demand to enable the intelligent mobile terminal to edit the captured short videos.

SUMMARY

The embodiments of the present disclosure provide a method of pushing video editing materials, and an intelligent mobile terminal, for acquiring video editing materials according to the type of an environment in the editing video.

In a first aspect, a method of pushing video editing material is provided. The method includes:
  acquiring an editing instruction;
  acquiring at least one frame image of an editing video according to the editing instruction, inputting the frame image into an environment classification model, and acquiring classification information which is output by the environment classification model and represents an environment in the frame image; and
  acquiring video editing materials according to the classification information, so that the video editing materials match an image environment of the frame image.

In a second aspect, an intelligent mobile terminal is provided, which includes:
  one or more processors;
  a memory, and
  one or more application programs, wherein the one or more application programs are stored in the memory and configured to:
  acquire an editing instruction;
  acquire at least one frame image of an editing video according to the editing instruction, input the frame image into an environment classification model, and acquire classification information which is output by the environment classification model and represents an environment in the frame image; and
  acquire video editing materials according to the classification information, so that the video editing materials match an image environment of the frame image.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings as described below show merely some embodiments of the present disclosure, and a person of ordinary skill in the art can also derive other drawings from these accompanying drawings without creative efforts.

DETAILED DESCRIPTION

In order to enable those skilled in the art to understand the solutions of the present disclosure in a better way, technical solutions of the embodiments of the present disclosure will be described clearly and completely below in combination with the accompanying drawings in embodiments of the present disclosure.

The technical solutions in the embodiments of the present disclosure will be clearly and completely described below with reference to the drawings in the embodiments of the present disclosure. Apparently, the embodiments as described are merely some, rather than all, of the embodiments of the present disclosure. Based on the embodiments in the present application, all the other embodiments obtained by a person of ordinary skills in the art without making creative efforts shall fall within the protection scope of the present disclosure.

Embodiment

In the related art, when editing a video using a mobile terminal, a user needs to obtain related video editing materials from local storage space or download same from a web server. The user may browse the editing materials through thumbnails of the materials or by a dynamic display window, select an editing material and then call the editing material to achieve the addition of the video material.

However, due to the diversity of the editing materials, there are a mass of video editing material data for the user to acquire and select. The user has to determine the editing material to be used in the current video editing process, from a large amount of data, which needs to take a lot of time for screening. In the case of acquiring the editing materials in a network environment, the user needs to spend more data flow to browse and filter the editing materials. Therefore, a method for determining the video editing material through massive browsing by the user in the related art is low in efficiency and needs to be improved urgently.

In some embodiments of the present disclosure, a method of pushing video editing materials, and an intelligent mobile terminal, for acquiring video editing materials according to the type of an environment in the editing video, are provided.

It should be noted that the environment classification model in the embodiments of the present disclosure is a convolutional neural network model in the deep learning technologies.

A convolutional neural network is mainly used for recognizing two-dimensional graphs that are invariant to displacement, scaling, and other forms of distortion. Since a feature detection layer of the convolutional neural network learns from training data, the explicit feature extraction is avoided when the convolutional neural network is used, and the learning from the training data is conducted implicitly.

The basic structure of the convolutional neural network includes two layers. One is a feature extraction layer, where the input of each neuron is connected to a local acceptance domain of a previous layer, and a local feature is extracted. Once the local feature is extracted, a positional relationship between the local feature and other features is consequently determined. The other is a feature mapping layer, where each computing layer of the network consists of a plurality of feature mappings, with each feature mapping being a plane in which all neurons are equal in weight. For the feature mapping structure, a sigmoid function with a small influence function kernel acts as an activation function of the convolution network, so that the feature mapping is invariant to the displacement.

In the embodiments of the present disclosure, the convolutional neural network model is trained for classifying the image environment, with a training process as follows: collecting an image as a training sample, and manually labeling the environment (such as, rain, fog, sunny, sandy or dim etc.) in the image as the classification information before training, where the environmental information is taken as the desired output for the image. The labeled training sample is input into the convolutional neural network model. Afterwards, the convolutional neural network model outputs an excitation output of data for the training sample. The desired output and the excitation output are compared for consistency. If they are not same, the weight of the convolutional neural network model is adjusted with an inverse algorithm to correct the output of the convolutional neural network model. Then, the training sample is input into the convolutional neural network model again to obtain a new round of excitation output, which then undergoes comparison again. This process is repeated until the desired output is consistent with the excitation output. A large amount of training samples, such as 1 million pictures, are used during training. When trained to convergence, the convolutional neural network model achieves an extremely high recognition success rate, and may recognize the environment in the pictures to be recognized quickly.

After being trained to convergence, the convolutional neural network model is used as an environment classification model to recognize the environment in the editing video, and acquires corresponding video editing materials according to the recognition result. For details, reference can be made to FIG. 1, which is a schematic basic flowchart of a method of pushing video editing materials in an embodiment of the present disclosure.

Figure 1:
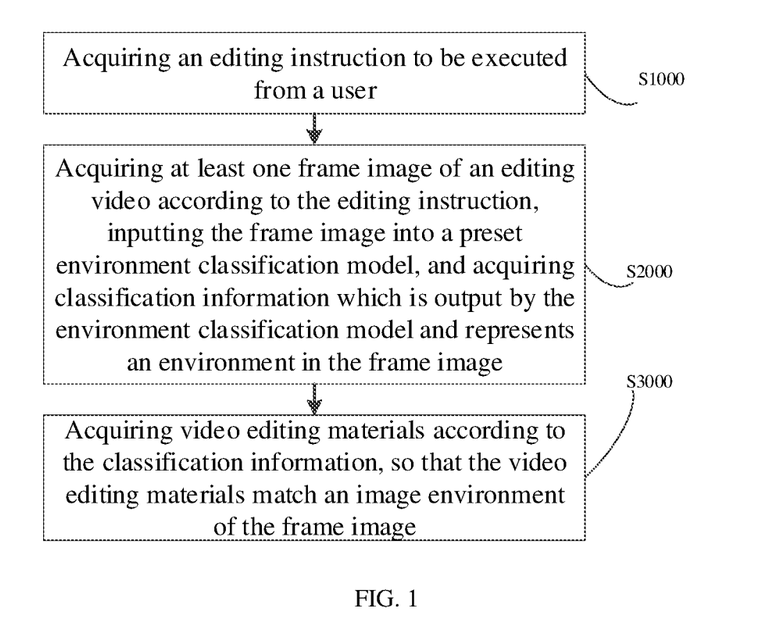
FIG. 1 is a schematic basic flowchart of a method of pushing video editing materials according to an embodiment of the present disclosure.

As shown in FIG. 1, the method of pushing video editing materials includes the following steps.

In step S1000, an editing instruction is acquired.

When a user uses an intelligent mobile terminal to edit a video being recorded or locally stored video, a clicking or sliding instruction issued from the user, by using a finger or a touch pen, is received before entering the editing state. After receiving the clicking or sliding instruction from the user, a stage of acquiring video editing materials is entered.

In step S2000, at least one frame image of an editing video is acquired according to the editing instruction, the frame image is input into an environment classification model, and classification information, which is output by the environment classification model and represents an environment in the frame image, is acquired.

At least one frame image of the editing video is acquired after the stage of acquiring the video editing materials is entered according to the instruction from the user.

Specifically, in the embodiments of the present disclosure, the editing video may be a video to be edited that is stored in a local storage space of the intelligent mobile terminal of the user, or may be a video being recorded through a camera of the intelligent mobile terminal, that is, the editing video may be a video data that has finished the recording or is still in a recording state.

The editing video consists of a number of frame images. After entering the stage of acquiring the video editing materials, the frame images are extracted randomly or regularly (such as, by extracting one frame image every one second).

The acquired frame images are input into the environment classification model, and classification information representing the environment in the frame images is acquired.

In step S3000, the video editing materials are acquired according to the classification information, so that the video editing materials match an image environment of the frame image.

After the classification information capable of representing the environment in the editing video is acquired, video editing materials are acquired according to the classification information. The video editing materials are materials dedicated for video or picture editing. During the video production, the materials will be imparted supplementary descriptions on the environment for which these materials are suitable (such as, by setting index tags on the materials), according to the content of each video editing material. When acquiring, by using the classification information as retrieval key words, the video editing materials that are associated with the retrieval key words and are matched to the environment of the frame images can be retrieved.

There are many methods for the intelligent mobile terminal to acquire the video editing materials. In a first method, direct screen and extraction can be performed within the local storage space during acquisition; and in a second method, the classification information may be sent to a server side during acquisition, and the server side performs retrieving and recalling in the network database, and then sends the retrieved data to the intelligent mobile terminal.

The video editing materials may match the image environment of the frame image. For example, when the environment of the frame image is detected to be a thunderstorm, the video editing materials matching a rainy environment, such as thunder, wind, and umbrellas, may be pushed to the user; and when the environment of the frame image is detected to be bright and sunny, the video editing materials, such as sun, smile face, or optimistic sayings, may be pushed to the user, but not limited thereto. Depending on different application scenarios, editing materials matching any environment can be developed for the user to select and use.

The video editing materials may be (but not limited to): video materials, text materials, image materials, or music materials.

In the above embodiment, by inputting the image of a frame image extracted from the editing video into the environment classification model that has finished training, the classification information of the environment in the frame image is acquired; and by taking the classification information as a condition, the video editing materials that match or have the same type as the classification information can be acquired and provided to user for selection and use. With such method, environment factors in the frame image can be analyzed, and then are taken as a filtering condition to perform initial screening on the massive video editing materials. As such, the video editing materials suitable for the environment are provided to the user, so that the user can conveniently and rapidly acquire video editing materials having high adaptability, thereby improving the pushing efficiency. In addition, the accuracy in releasing the video editing materials is also increased, and the consumption of data flow is reduced for the user.

In some embodiments, during the extraction of the frame images, a plurality frame images of the editing video are acquired. When the environmental scene varies in the editing video, the environment acquired from the plurality of frame images is different and the classification result of the editing frame images needs to be unified. For details, reference can be made to FIG. 2, which is a schematic flowchart for unifying a plurality of classification information according to an embodiment of the present disclosure.

Figure 2:
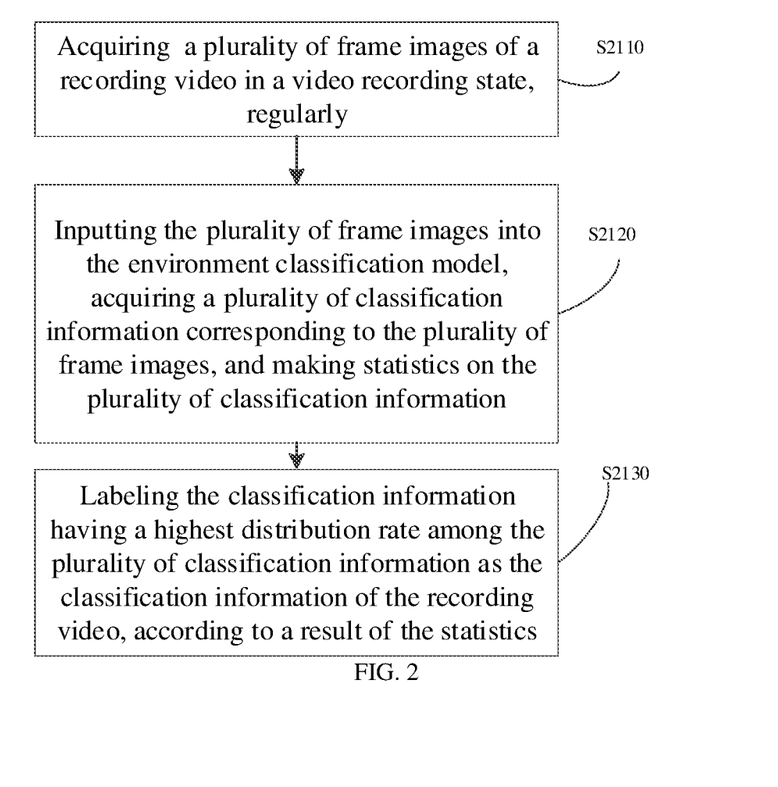
FIG. 2 is a schematic flowchart for unifying a plurality of classification information according to an embodiment of the present disclosure.

As shown in FIG. 2, step S2000 specifically includes the following steps.

In step S2110, a plurality of frame images of a recording video in a video recording state are acquired regularly.

In the embodiments of the present disclosure, the editing video is a video being recorded through a camera of an intelligent mobile terminal, that is, the editing video is video data that is still in a recording state.

In the video recording state, the images of the frame images are acquired by accessing the cache space, and a plurality of frame images of the video being recorded are acquired by a regular extraction method (such as, by extracting one frame image every two seconds).

In step S2120, the plurality of frame images are input into the environment classification model, and a plurality of classification information corresponding to the plurality of frame images are acquired, and statistics is made on the plurality of classification information.

According to a chronological order of the acquisition, the images of the plurality of frame images are input into the environment classification model respectively, to acquire a plurality of classification information corresponding to the plurality of frame images.

After the plurality of classification information are acquired, a statistics is performed on the plurality of frame images according to the types of the classification information.

In step S2130, according to the result of the statistics, the classification information having a highest distribution rate among the plurality of classification information is labeled as the classification information of the recording video.

After the statistics is completed, the type of classification information that has the highest proportion among the statistical results is acquired. For example, among ten frame images, if five of them have the classification information classified as snowing environment, then the classification information classified as snowing environment is the classification information type having the highest proportion. Then, the classification information is labeled as the classification information of the recording video, in order to facilitate the acquisition of the video editing materials during the editing of the recording video.

In the embodiments of the present disclosure, by classifying the environment of the video while the video is still in a recording state, the editing time of the user can be reduced effectively. The statistics on the plurality of classification results may facilitate the determination of the main environment of the editing video.

In some embodiments, the editing video lasts long, and within a relatively long time span, the switching time of each environment is also relatively longer. Therefore, when editing a video, it is necessary to separately edit the clips having various environment. For details, reference can be made to FIG. 3, which is a schematic flowchart for processing a plurality of classification information in the embodiments of the present disclosure.

Figure 3:
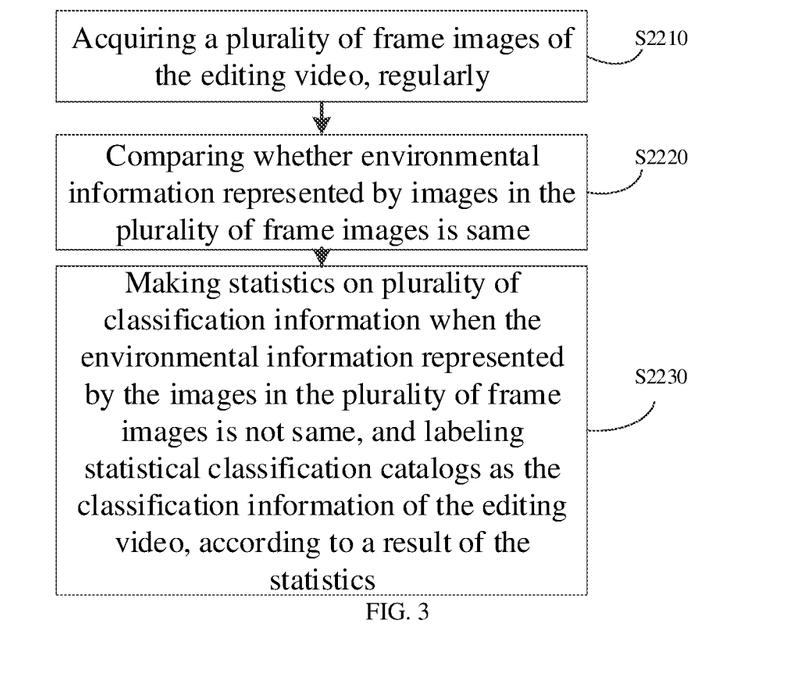
FIG. 3 is a schematic flowchart for processing a plurality of classification information according to an embodiment of the present disclosure.

As shown in FIG. 3, step S2000 specifically includes the following steps.

In step S2210, a plurality of frame images of the editing video are acquired regularly.

The plurality of frame images of the editing video are acquired by a regular extraction method (such as, by extracting one frame image every six seconds). The editing video in the embodiments of the present disclosure may be video data that has finished the recording or is still in a recording state.

In step S2220, whether environment of images in the plurality of frame images is same is compared.

According to a chronological order of the acquisition, the images of the plurality of frame images are input into the environment classification model, respectively, to acquire a plurality of classification information corresponding to the plurality of frame images.

After the plurality of classification information is acquired respectively, whether the plurality of classification information is same is compared. In the case that the classification information is not the same, statistics is performed by combining the types of the classification information.

In step S2230, statistics is made on the plurality of classification information when the environment of the images in the plurality of frame images is not same, and statistical classification catalogs are labeled as the classification information of the editing video according to a result of the statistics.

According to the comparison result, when there is a plurality of environment of the images in the plurality of frame images, the statistics is performed based on the types of the classification information, and the statistical classification catalogs are regarded as the classified types in the editing video; and after the statistics has been completed, the statistical classification catalogs are labeled as the classification information of the editing video.

In some embodiments, when the editing video has a plurality of classification information and the classification catalogs obtained from the statistics are labeled as the classification information of the editing video, after the video editing materials corresponding to the plurality of classification information are retrieved, it is necessary to sort the video editing materials so as to present them subsequently. For details, reference can be made to FIG. 4, which is a schematic flowchart for sorting video editing materials according to an embodiment of the present disclosure.

Figure 4:
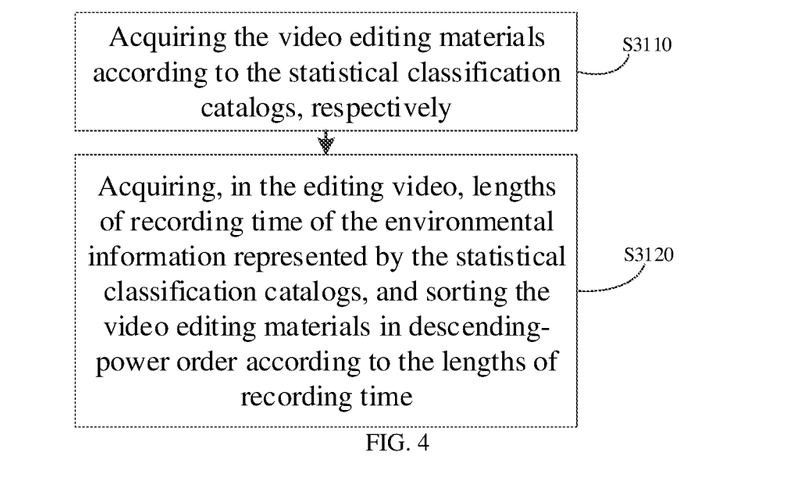
FIG. 4 is a schematic flowchart for sorting video editing materials according to an embodiment of the present disclosure.

As shown in FIG. 4, step S3000 specifically includes the following steps.

In step S3110, the video editing materials are acquired according to the statistical classification catalogs, respectively.

The video editing materials are acquired respectively according to the classification catalogs. For example, when there are totally four scenes with varied environments in the editing video, the corresponding environment classification information of the editing video may also have four classification catalogs, and four sets of video editing materials are acquired through the four classification catalogs. Supposing that the number of defined materials in each material set is 3, a total of twelve video editing materials are then acquired according to the classification information of the editing video.

In step S3120, lengths of recording time of the environment represented by the statistical classification catalogs in the editing video are acquired, and the video editing materials are sorted in a descending order according to the lengths of recording time.

After the video editing materials are acquired, the lengths of recording time of the environment represented by the classification catalogs in the editing video are acquired. Because the frame images are extracted by a regular extraction method, when the environment in the editing video changes, the length of recording time of a certain type of environment in the editing video can be acquired by making statistics on the time interval between two sequentially different classification information.

The statistics is made on the lengths of recording time of the environment represented by the respective statistical classification catalogs in the editing video, and the video editing materials are sorted in a descending order according to the length of recording time.

For example, when there are totally four scenes with varied environments in the editing video, the classification information of the corresponding environments of the editing video may also constitute four classification catalogs, and four sets of video editing materials are acquired through the four classification catalogs. Supposing that the number of defined materials in each material set is 3, a total of twelve video editing materials are then acquired according to the classification information of the editing video.

Based on the statistics on the time length, an environment represented by the first classification catalog has a length of recording time of 20 seconds in the editing video, an environment represented by the second classification catalog has a length of recording time of 50 seconds in the editing video, an environment represented by the third classification catalog has a length of recording time of 30 seconds in the editing video, and an environment represented by the fourth classification catalog has a length of recording time of 15 seconds in the editing video. Then, during sorting, three video editing materials matching the first classification catalog are arranged and presented in the third position, and so forth, three video editing materials matching the fourth classification catalog are arranged at the end.

The video editing materials are sorted based on the time lengths of different environment in the editing video. As there may be a greater probability for environment which is longer in time to be selected as an area to be edited or as an area in which an editing action actually takes place, by sorting the video editing materials in a descending order based on the lengths of recording time, pushing accuracy can be achieved and the editing efficiency can be improved.

In some embodiments, when the editing video has a long duration, it is necessary to adjust the video editing materials to be pushed to the user after the position where the editing actually occurs is learned. For details, reference can be made to FIG. 5, which is a schematic flowchart for acquiring time periods of clips of environment according to an embodiment of the present disclosure.

Figure 5:
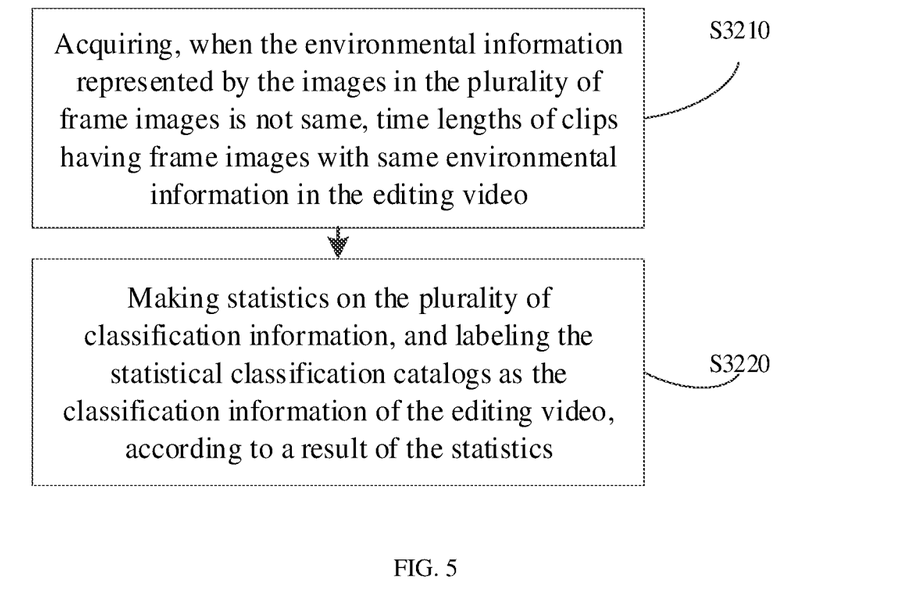
FIG. 5 is a schematic flowchart for acquiring time periods of clips of environment according to an embodiment of the present disclosure.

As shown in FIG. 5, after step S3000, the method also includes the following steps.

In step S3210, when the environment of the images in the plurality of frame images is not same, the time periods of clips with the frame images having the same environment, in the editing video, are acquired.

Based on a comparison result, when the environment of the images in the plurality of frame images is of various types, the time periods of clips with the frame images having the same environment, in the editing video, are acquired. Specifically, after the video editing materials are acquired, the time periods of clips of the environment represented by the classification catalogs in the editing video are acquired. Because the frame images are extracted in a regular extraction method, the time period of a clip with a certain environment in the editing video can be acquired by making statistics on a time interval between two different pieces of classification information which are subsequently-occurred, when the environment in the editing video changes. For example, if two different pieces of classification information which are subsequently-occurred are detected to occur at 1:20s and 1:50s, respectively, it is then proved that the time period of clip of the environment represented by the previous classification information in the editing video is between 1:20s and 1:50s.

In step S3220, the statistics is made on the plurality of classification information, and statistical classification catalogs are labeled as the classification information of the editing video according to a result of the statistics.

According to a comparison result, when there is a plurality of environment of the images in the plurality of frame images, statistics is performed on the types of the classification information, where the statistical classification catalogs are the classification types of the editing video; and after the statistics has been completed, the statistical classification catalogs are labeled as the classification information of the editing video.

Figure 6:
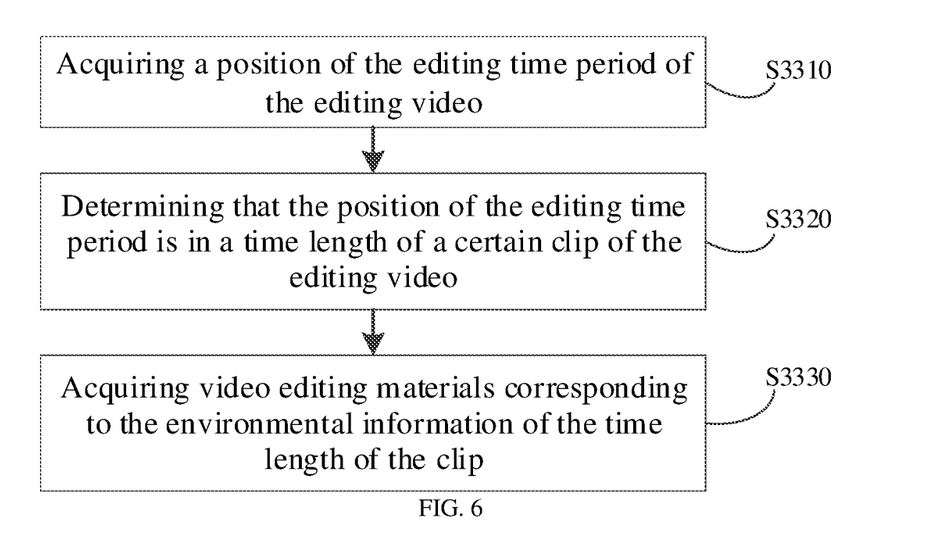
FIG. 6 is a schematic flowchart for adjusting a pushing result of video editing materials based on an editing position according to an embodiment of the present disclosure.

Referring to FIG. 6, a schematic flowchart for adjusting a pushing result of video editing materials based on an editing position according to an embodiment of the present disclosure is shown.

As shown in FIG. 6, step S3000 specifically includes the following steps.

In step S3310, a time point of editing position of the editing video is acquired.

When an intelligent mobile terminal is used for video editing, it is necessary to select an editing position in the video, i.e., a time point or a time period of the video, for conducting video editing. After selecting a specific editing position, the time point where the editing position locates as selected by the user can be learnt.

In step S3320, a time period of a clip of the editing video to which the time point of editing position belongs is determined.

The time point at which the editing position occurs is compared with the time period of clips derived from the time durations of the environment, to determine which time period of clip of the editing video, with continuously recorded environment, is the time point at which the editing position occurs is within. If the time point at which the editing occurs is at 1:25s, and the environment of 1:10s-1:40s in the editing video is "snowing", it is then determined that the editing time occurs in a "snow" environment.

In step S3330, the video editing materials corresponding to the environment in the time period of clip are acquired. After determining which time period of clip in the editing video, with continuously recorded environment, does the time point at which the editing position occurs locates, video editing materials matching the environment in the time period of clip are acquired for the user to select.

The classification information of the editing video is first acquired; then, the statistics is performed on the classification information; the time periods of recording of the environment represented by each classification information, in the editing video, are acquired; and when the actual time point at which the editing occurs is learnt, by determining the time period of clip to which the time point belongs, the video editing materials matching the environment within the time period of clip can be called, thereby achieving the rapid pushing of the video editing materials.

The embodiments of the present disclosure further provide a system for pushing video editing materials. For details, reference can be made to FIG. 7, which is a block diagram of a basic structure of the system for pushing video editing materials according to an embodiment of the present disclosure.

Figure 7:
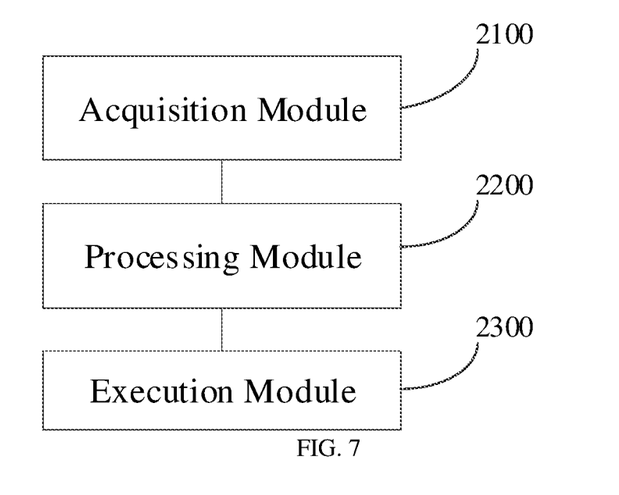
FIG. 7 is a block diagram of a basic structure of a system for pushing video editing materials according to an embodiment of the present disclosure.

As shown in FIG. 7, a system for pushing video editing materials includes an acquisition module 2100, a processing module 2200, and an execution module 2300. Among others, the acquisition module 2100 is configured to acquire an editing instruction; the processing module 2200 is configured to acquire at least one frame image of an editing video according to the editing instruction, input the frame image into an environment classification model, and acquire classification information which is output by the environment classification model and represents an environment in the frame image; and the execution module 2300 is configured to acquire video editing materials according to the classification information, so that the video editing materials match an image environment of the frame image.

In the system for pushing video editing materials of the embodiments of the present disclosure, by inputting the image of a frame image extracted from the editing video into the environment classification model that has finished training, the classification information of the environment in the frame image is acquired; and by taking the environment classification information as a condition, video editing materials that match or have the same type as the classification information can be acquired and provided to user for selection and use. Through such method, environment factors in the frame image can be analyzed, and then are taken as a filtering condition to perform initial screening on the massive video editing materials. As such, the video editing materials suitable for the environment can be provided to the user, so that the user can conveniently and rapidly acquire video editing materials with very high adaptability, thereby improving the pushing efficiency. In addition, the accuracy degree in the delivery of the video editing materials can also be increased, and the consumption of data flow of the user can be reduced as well.

In some embodiments, the system for pushing video editing materials further includes: a first acquisition sub-module, a first statistics sub-module, and a first processing sub-module. Among others, the first acquisition sub-module is configured to acquire a plurality of frame images of a recording video in a video recording state, regularly; the first statistics sub-module is configured to input the plurality of frame images into the environment classification model, acquire a plurality of classification information corresponding to the plurality of frame images, and make statistics on the plurality of classification information; and the first processing sub-module is configured to label the classification information having a highest distribution rate among the plurality of classification information as the classification information of the recording video, according to a result of the statistics.

In some embodiments, the system for pushing video editing material further includes: a second acquisition sub-module, a first comparison sub-module, and a second processing sub-module. Among others, the second acquisition sub-module is configured to acquire a plurality of frame images of the editing video, regularly; the first comparison sub-module is configured to compare whether environment of images in the plurality of frame images is same; and the second processing sub-module is configured to make statistics on plurality of classification information when the environment of the images in the plurality of frame images is not same, and label statistical classification catalogs as the classification information of the editing video, according to a result of the statistics.

In some embodiments, the system for pushing video editing materials further includes: a third acquisition sub-module and a first sorting sub-module. Among others, the third acquisition sub-module is configured to acquire the video editing materials according to the statistical classification catalogs, respectively; and the first sorting sub-module is configured to acquire, in the editing video, lengths of recording time of the environment represented by the statistical classification catalogs, and sort the video editing materials in descending order according to the lengths of recording time.

In some embodiments, the system for pushing video editing materials further includes a third processing sub-module and a second statistics sub-module. Among others, the third processing sub-module is configured to acquire, when the environment of the images in the plurality of frame images is not same, time time periods of clips having frame images with same environment in the editing video; and the second statistics sub-module is configured to make statistics on the plurality of classification information, and label the statistical classification catalogs as the classification information of the editing video, according to a result of the statistics.

In some embodiments, the system for pushing video editing materials further includes: a fourth acquisition sub-module, a first determination sub-module, and a fifth acquisition sub-module. Among others, the fourth acquisition sub-module is configured to acquire a time point of editing position of the editing video; the first determination sub-module is configured to determine a time period of a clip of the editing video to which the time point of editing position belongs; and the fifth acquisition sub-module is configured to acquire video editing materials corresponding to the environment of the time period of the clip.

In some embodiments, the environment classification model is specifically a convolutional neural network model having been trained to a convergence state, and the convolutional neural network model is trained for classifying image environment.

Figure 8:
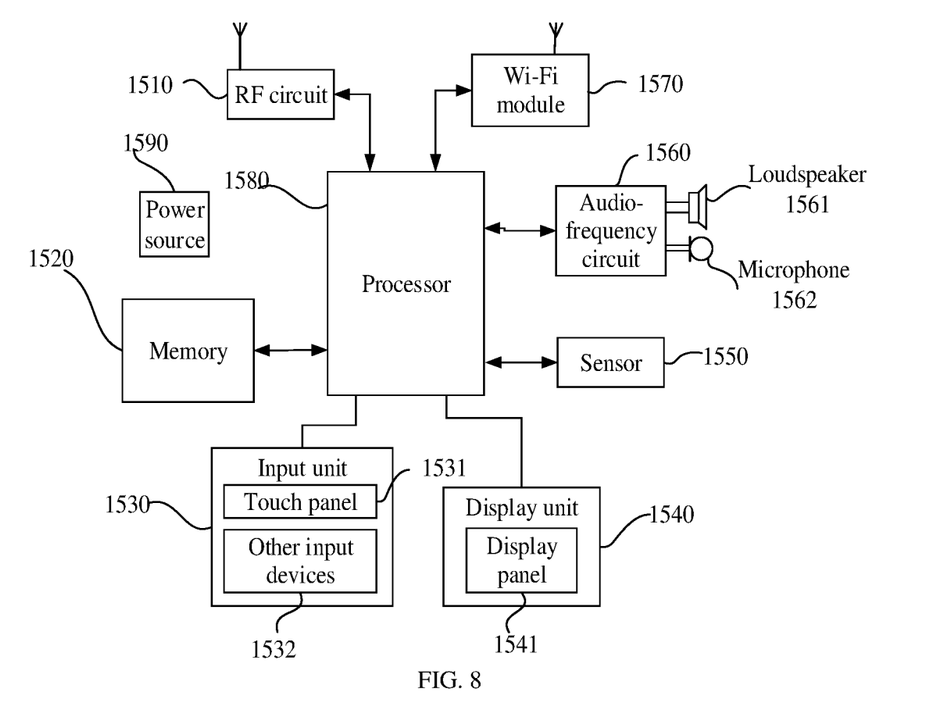
FIG. 8 is a block diagram of a basic structure of an intelligent mobile terminal according to an embodiment of the present disclosure.

An embodiment further provides an intelligent mobile terminal. Referring to FIG. 8 specifically, a schematic diagram of a basic structure of an intelligent mobile terminal according to an embodiment of the present disclosure is shown.

It should be noted that, in the embodiments of the present disclosure, all programs configured to implement the method in the embodiments of the present disclosure are stored in a memory 1520 of the intelligent mobile terminal, and a processor 1580 can call the programs in the memory 1520 and execute all functions listed in the aforesaid method. Since functions that may be implemented by the intelligent mobile terminal have been described in detail in the method in the embodiments of the present disclosure, thus are not described here for the purpose of conciseness.

An embodiment of the present disclosure also provides an intelligent mobile terminal. As shown in FIG. 8, for the convenience of description, only the parts related to the embodiments of the present disclosure are shown. For the specific technical details not disclosed, reference can be made to the method part of the embodiment of the present disclosure. The terminal may be any terminal device including an intelligent mobile terminal, a tablet computer, a Personal Digital Assistant (PDA), a Point of Sales (POS), an onboard computer. The terminal being an intelligent mobile terminal is taken as an example.

FIG. 8 is a block diagram showing a partial structure of an intelligent mobile terminal related to the terminal provided by an embodiment of the present disclosure. Referring to FIG. 8, the intelligent mobile terminal includes: a radio frequency (RF) circuit 1510, a memory 1520, an input unit 1530, a display unit 1540, a sensor 1550, an audio circuit 1560, a wireless fidelity (Wi-Fi) module 1570, a processor 1580, a power supply 1590 and other components. It will be understood by those skilled in the art that the structure of the intelligent mobile terminal shown in FIG. 8 does not constitute a limitation to the intelligent mobile terminal, and may include more or less components than those illustrated, or a combination of some components, or different component arrangements.

The respective components of the intelligent mobile terminal is described in detail as follows by combining FIG. 8.

The RF circuit 1510 may be used for receiving and transmitting signals during the transmission or reception of information or during a call. Specifically, after receiving downlink information from a base station, the downlink information is processed by the processor 1580. In addition, data designed for the uplink is sent to the base station. Generally, the RF circuit 1510 includes, but is not limited to, an antenna, at least one amplifier, a transceiver, a coupler, a Low Noise Amplifier (LNA), a duplexer, and the like. In addition, the RF circuitry 1510 may also communicate with the network and other devices via wireless communication. The above wireless communication may use any communication standard or protocol, including but not limited to Global System for Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS), and the like.

The memory 1520 may be used to store software programs and modules. The processor 1580 executes various functional applications and data processing of the intelligent mobile terminal by running the software programs and modules stored in the memory 1520. The memory 1520 may mainly include a program storage area and a data storage area. The program storage area may store an operating system, an application required for at least one function (such as a voiceprint playing function, an image playing function, etc.), and the like. The data storage area may store data (such as audio data, a directory, etc.) created according to the usage of the intelligent mobile terminal. Moreover, the memory 1520 may include a high-speed random-access memory, and may also include a non-volatile memory, such as at least one magnetic disk memory device, flash memory device, or other volatile solid-state memory device.

The input unit 1530 may be configured to receive input numeric or character information and to generate key signal inputs related to user settings and function controls of the intelligent mobile terminal. Specifically, the input unit 1530 may include a touch panel 1531 and other input device 1532. The touch panel 1531, also referred to as a touch screen, may collect touch operations of the user on or near the touch panel (for example, the user may use any proper article or accessory, such as a finger, a stylus, or the like, to operate on the touch panel 1531 or near the touch panel 1531), and drive a corresponding connecting device according to a preset program. Optionally, the touch panel 1531 may include two parts: a touch detection device and a touch controller. The touch detection device detects the touch orientation of the user, detects a signal generated by the touch operation, and transmits the signal to the touch controller. The touch controller receives the touch information from the touch detection device, converts the touch information into contact coordinates, and sends same to the processor 1580, and may receive commands from the processor 1580 and execute them. In addition, the touch panel 1531 may be implemented as various types such as resistive type, capacitive type, infrared type, and surface acoustic wave type. In addition to the touch panel 1531, the input unit 1530 may also include other input device 1532. Specifically, other input device 1532 may include, but are not limited to, one or more of a physical keyboard, a function key (such as a volume control button, a switch button, etc.), a trackball, a mouse, a joystick, and the like.

The display unit 1540 may be used to display information input by the user or information provided to the user as well as various menus of the intelligent mobile terminal. The display unit 1540 may include a display panel 1541. Optionally, the display panel 1541 may be configured in the form of a liquid crystal display (LCD), an organic light-emitting diode (OLED), or the like. Further, the touch panel 1531 may be overlaid on the display panel 1541. After the touch panel 1531 detects a touch operation on or near the touch panel, the touch panel 1531 transmits same to the processor 1580 to determine the type of the touch event. Then the processor 1580, according to the type of the touch event, provides a corresponding visual output on the display panel 1541. Although in FIG. 8, the touch panel 1531 and the display panel 1541 are used as two independent components to implement the input and input output functions of the intelligent mobile terminal, in some embodiments, the touch panel 1531 and the display panel 1541 may be integrated to realize the input and output functions of the intelligent mobile terminal.

The intelligent mobile terminal may also include at least one type of sensor 1550, such as a light sensor, a motion sensor, and other sensors. Specifically, the light sensor may include an ambient light sensor and a proximity sensor. The ambient light sensor may adjust the brightness of the display panel 1541 according to the brightness of the ambient light. The proximity sensor may close the display panel 1541 and/or the backlight when the intelligent mobile terminal moves to the ear. As a kind of motion sensor, an accelerometer sensor may detect the acceleration of each direction (usually three axes), may detect the magnitude and direction of gravity at rest, and may be used for an application that identifies the gesture of the intelligent mobile terminal (such as horizontal and vertical screen switching, related game, magnetometer attitude calibration) and vibration recognition related functions (such as pedometer, tapping), etc. Other sensors such as gyroscopes, barometers, hygrometers, thermometers, infrared sensors, etc. that may be equipped on intelligent mobile terminals will not be described here.

An audio circuit 1560, a speaker 1561, and a microphone 1562 may be used to provide an audio interface between the user and the intelligent mobile terminal. The audio circuit 1560 may transmit the electrical signal converted from the received audio data to the speaker 1561, and the speaker 1561 converts it into a voiceprint signal output. On the other hand, the microphone 1562 converts the collected voiceprint signal into an electrical signal which is received by the audio circuit 1560 to be converted to audio data, and the audio data is output to the processor 1580 for processing and being transmitted to another intelligent mobile terminal via the RF circuit 1510, or the audio data is output to the memory 1520 for further processing.

Wi-Fi is a short-range wireless transmission technology. The intelligent mobile terminal may help users to send and receive e-mail, browse web pages and access streaming media through the Wi-Fi module 1570. It provides users with wireless broadband Internet access. Although FIG. 8 shows the Wi-Fi module 1570, it may be understood that it does not belong to the essential configuration of the intelligent mobile terminal, and may be omitted as needed within a scope in which the essence of the present disclosure is not changed.

The processor 1580 is the control center of the intelligent mobile terminal that may connect various portions of the entire intelligent mobile terminal by using various interfaces and lines, and may execute various functions and processing data of the intelligent mobile terminal by running or executing the software programs and/or modules stored in the memory 1520 and calling data stored in the memory 1520, so as to realize overall monitoring of the intelligent mobile terminal. Optionally, the processor 1580 may include one or more processing units. Preferably, the processor 1580 may integrate an application processor and a modem processor. The application processor mainly processes an operating system, a user interface, an application, and the like. The modem processor primarily handles wireless communications. It will be appreciated that the above described modem processor may also be not integrated into the processor 1580.

The intelligent mobile terminal also includes a power supply 1590 (such as a battery) that supplies power to the various components. Preferably, the power supply may be logically connected to the processor 1580 via a power management system to manage functions such as charging, discharging, and power consumption management through the power management system.

Although not shown, the intelligent mobile terminal may further include a camera, a Bluetooth module, and the like, and details thereof are not described herein for the purpose of conciseness.

In some embodiments, a video editing and pushing method is provided. The method includes:

acquiring an editing instruction to be executed from a user;

acquiring at least one frame image of an editing video according to the editing instruction, inputting the frame image into a preset environment classification model, and acquiring classification information which is output by the environment classification model and represents an environment in the frame image; and acquiring video editing materials according to the classification information, so that the video editing materials match an image environment of the frame image.

In some embodiments, the acquiring at least one frame image of the editing video according to the editing instruction, inputting the frame image into the preset environment classification model, and acquiring classification information which is output by the environment classification model and represents the environment in the frame image, specifically includes:

acquiring a plurality of frame images of a recording video in a video recording state, regularly;

inputting the plurality of frame images into the environment classification model, acquiring a plurality of classification information corresponding to the plurality of frame images, and making statistics on the plurality of classification information; and labeling the classification information having a highest distribution rate among the plurality of classification information as the classification information of the recording video, according to a result of the statistics.

In some embodiments, the acquiring at least one frame image of the editing video according to the editing instruction, inputting the frame image into the preset environment classification model, and acquiring classification information which is output by the environment classification model and represents the environment in the frame image, specifically includes:

acquiring a plurality of frame images of the editing video, regularly;

comparing whether environmental information represented by images in the plurality of frame images is same; and making statistics on plurality of classification information when the environmental information represented by the images in the plurality of frame images is not same, and labeling statistical classification catalogs as the classification information of the editing video, according to a result of the statistics.

In some embodiments, the acquiring video editing materials according to the classification information, so that the video editing materials match the image environment of the frame image, specifically includes:

acquiring the video editing materials according to the statistical classification catalogs, respectively; and acquiring, in the editing video, lengths of recording time of the environmental information represented by the statistical classification catalogs, and sorting the video editing materials in descending-power order according to the lengths of recording time.

In some embodiments, after the comparing whether environmental information represented by images in the plurality of frame images is same, the method further includes:

acquiring, when the environmental information represented by the images in the plurality of frame images is not same, time lengths of a clip having frame images with same environmental information in the editing video; and making statistics on the plurality of classification information, and labeling the statistical classification catalogs as the classification information of the editing video, according to a result of the statistics.

In some embodiments, the acquiring video editing materials according to the classification information, so that the video editing materials match the image environment of the frame image, specifically includes:

acquiring an position of the editing time period of the editing video;

determining that the position of the editing time period is in a time length of a certain clip of the editing video; and acquiring video editing materials corresponding to the environmental information of the time length of the clip.

In some embodiments, the environment classification model is specifically a convolutional neural network model having been trained to a convergence state, and the convolutional neural network model is trained for classifying image environment.

In some embodiments, an intelligent mobile terminal is also provided, including:

one or more processors;

a memory, and one or more application programs, wherein the one or more application programs are stored in the memory and configured to be executed by the one or more processors, to perform the aforesaid video editing and pushing method.

It should be noted that the description and the accompanying drawings of the present disclosure present some optional embodiments of the present disclosure, however, the present disclosure can be implemented in many different forms, which are not limited to the embodiments set forth herein. These embodiments are not to be construed as additional limitations to the content of the present disclosure, and the purpose of providing these embodiments is to enable the present disclosure to be understood more thoroughly and comprehensively. In addition, the aforesaid technical features may be further combined with each other to form various embodiments which are not listed above, and all of them are to be regarded as the scope described in the description of the present disclosure. Further, modifications and variations may be made by those skilled in the art according to the aforesaid specification, and all such modifications and variations shall fall within the protection scope of the appended claims.

The invention claimed is:

1. A method of pushing video editing materials, comprising:

acquiring an editing instruction in a video recording state;

acquiring at least one frame image of an editing video according to the editing instruction, inputting the frame image into an environment classification model, and acquiring classification information which is output by the environment classification model and represents an environment in the frame image, wherein the environment classification model is a convolutional neural network model having been trained to a convergence state, and the convolutional neural network model is trained for classifying image environment; and acquiring video editing materials according to the classification information, so that the video editing materials match an image environment of the frame image.

2. The method according to claim 1, wherein the acquiring at least one frame image of the editing video according to the editing instruction, inputting the frame image into the environment classification model, and acquiring classification information which is output by the environment classification model and represents the environment in the frame image, comprises:

acquiring a plurality of frame images of the editing video according to the editing instruction;

inputting the plurality of frame images into the environment classification model, acquiring a plurality of classification information corresponding to the plurality of frame images, and making statistics on the plurality of classification information; and labeling the classification information having a highest distribution rate among the plurality of classification information as the classification information of the recording video, according to a result of the statistics.

3. The method according to claim 1, wherein the acquiring at least one frame image of the editing video according to the editing instruction, inputting the frame image into the environment classification model, and acquiring classification information which is output by the environment classification model and represents the environment in the frame image, comprises:

acquiring a plurality of frame images of the editing video according to the editing instruction;

inputting the plurality of frame images into the environment classification model, and acquiring a plurality of classification information corresponding to the plurality of frame images;

comparing, according to the plurality of classification information, whether environment of images in the plurality of frame images is same; and making statistics on the plurality of classification information when the environment of the images in the plurality of frame images is not same, and labeling statistical classification catalogs as the classification information of the editing video, according to a result of the statistics.

4. The method according to claim 3, wherein the acquiring video editing materials according to the classification information, so that the video editing materials match the image environment of the frame image, comprises:

acquiring the video editing materials according to the statistical classification catalogs, respectively; and acquiring, in the editing video, lengths of recording time of the environment represented by the statistical classification catalogs, and sorting the video editing materials in descending order according to the lengths of recording time.

5. The method according to claim 3, wherein the method further comprises:

acquiring, when the environment of the images in the plurality of frame images is not same, time periods of clips with same environment in the editing video, and the acquiring video editing materials according to the classification information, so that the video editing materials match the image environment of the frame image, comprises:

acquiring a time point of editing position of the editing video;

determining a time period of a clip of the editing video to which the time point of editing position belongs; and acquiring video editing materials corresponding to the environment of the time period of the clip.

6. The method according to claim 1, wherein the acquiring at least one frame image of the editing video comprises:
   acquiring at least one frame image of the editing video regularly; or
   acquiring at least one frame image of the editing video by a random extraction manner.

7. An intelligent mobile terminal, comprising:
   one or more processors;
   a memory, and
   one or more application programs, wherein the one or more application programs are stored in the memory and configured to be executed by the one or more processors, to:
   acquire an editing instruction in a video recording state;
   acquire at least one frame image of an editing video according to the editing instruction, input the frame image into an environment classification model, and acquire classification information which is output by the environment classification model and represents an environment in the frame image, wherein the environment classification model is a convolutional neural network model having been trained to a convergence state, and the convolutional neural network model is trained for classifying image environment; and
   acquire video editing materials according to the classification information, so that the video editing materials match an image environment of the frame image.

8. The intelligent mobile terminal according to claim 7, wherein the acquiring at least one frame image of the editing video according to the editing instruction,
   inputting the frame image into the environment classification model, and acquiring classification information which is output by the environment classification model and represents the environment in the frame image, comprises:
   acquiring a plurality of frame images of the editing video according to the editing instruction;
   inputting the plurality of frame images into the environment classification model, acquiring a plurality of classification information corresponding to the plurality of frame images, and making statistics on the plurality of classification information; and
   labeling the classification information having a highest distribution rate among the plurality of classification information as the classification information of the recording video, according to a result of the statistics.

9. The intelligent mobile terminal according to claim 7, wherein the acquiring at least one frame image of the editing video according to the editing instruction, inputting the frame image into the environment classification model, and acquiring classification information which is output by the environment classification model and represents the environment in the frame image, comprises:
   acquiring a plurality of frame images of the editing video according to the editing instruction;
   inputting the plurality of frame images into the environment classification model, and acquiring a plurality of classification information corresponding to the plurality of frame images;
   comparing, according to the plurality of classification information, whether environment of images in the plurality of frame images is same; and
   making statistics on the plurality of classification information when the environment of the images in the plurality of frame images is not same, and labeling statistical classification catalogs as the classification information of the editing video, according to a result of the statistics.

10. The intelligent mobile terminal according to claim 9, wherein the acquiring video editing materials according to the classification information, so that the video editing materials match the image environment of the frame image, comprises:
   acquiring the video editing materials according to the statistical classification catalogs, respectively; and
   acquiring, in the editing video, lengths of recording time of the environment represented by the statistical classification catalogs, and sorting the video editing materials in descending order according to the lengths of recording time.

11. The intelligent mobile terminal according to claim 9, wherein the method further comprises:
   acquiring, when the environment of the images in the plurality of frame images is not same, time periods of clips with same environment in the editing video, and
   the acquiring video editing materials according to the classification information, so that the video editing materials match the image environment of the frame image, comprises:
   acquiring a time point of editing position of the editing video;
   determining a time period of a clip of the editing video to which the time point of editing position belongs; and
   acquiring video editing materials corresponding to the environment of the time period of the clip.

12. The intelligent mobile terminal according to claim 7, wherein the acquiring at least one frame image of the editing video comprises:
   acquiring at least one frame image of the editing video regularly; or
   acquiring at least one frame image of the editing video by a random extraction manner.

13. A non-transitory computer-readable storage medium storing at least one computer program that includes at least program instruction, wherein the computer program, when run by a processor, enables the processor to perform the following steps of a method:
   acquiring an editing instruction in a video recording state;
   acquiring at least one frame image of an editing video according to the editing instruction, inputting the frame image into an environment classification model, and acquiring classification information which is output by the environment classification model and represents an environment in the frame image, wherein the environment classification model is a convolutional neural network model having been trained to a convergence state, and the convolutional neural network model is trained for classifying image environment; and
   acquiring video editing materials according to the classification information, so that the video editing materials match an image environment of the frame image.

14. The non-transitory computer-readable storage medium according to claim 13, wherein the acquiring at least one frame image of the editing video according to the editing instruction, inputting the frame image into the environment classification model, and acquiring classification information which is output by the environment classification model and represents the environment in the frame image, comprises:
   acquiring a plurality of frame images of the editing video according to the editing instruction;

inputting the plurality of frame images into the environment classification model, acquiring a plurality of classification information corresponding to the plurality of frame images, and making statistics on the plurality of classification information; and labeling the classification information having a highest distribution rate among the plurality of classification information as the classification information of the recording video, according to a result of the statistics.

15. The non-transitory computer-readable storage medium according to claim 13, wherein the acquiring at least one frame image of the editing video according to the editing instruction, inputting the frame image into the environment classification model, and acquiring classification information which is output by the environment classification model and represents the environment in the frame image, comprises:

acquiring a plurality of frame images of the editing video according to the editing instruction;

inputting the plurality of frame images into the environment classification model, and acquiring a plurality of classification information corresponding to the plurality of frame images;

comparing, according to the plurality of classification information, whether environment of images in the plurality of frame images is same; and making statistics on the plurality of classification information when the environment of the images in the plurality of frame images is not same, and labeling statistical classification catalogs as the classification information of the editing video, according to a result of the statistics.

16. The non-transitory computer-readable storage medium according to claim 15, wherein the acquiring video editing materials according to the classification information, so that the video editing materials match the image environment of the frame image, comprises:

acquiring the video editing materials according to the statistical classification catalogs, respectively; and acquiring, in the editing video, lengths of recording time of the environment represented by the statistical classification catalogs, and sorting the video editing materials in descending order according to the lengths of recording time.

17. The non-transitory computer-readable storage medium according to claim 15, wherein the method further comprises:

acquiring, when the environment of the images in the plurality of frame images is not same, time periods of clips with same environment in the editing video, and the acquiring video editing materials according to the classification information, so that the video editing materials match the image environment of the frame image, comprises:

acquiring a time point of editing position of the editing video;

determining a time period of a clip of the editing video to which the time point of editing position belongs; and acquiring video editing materials corresponding to the environment of the time period of the clip.

* * * * *